United States Patent Office 2,766,126
Patented Oct. 9, 1956

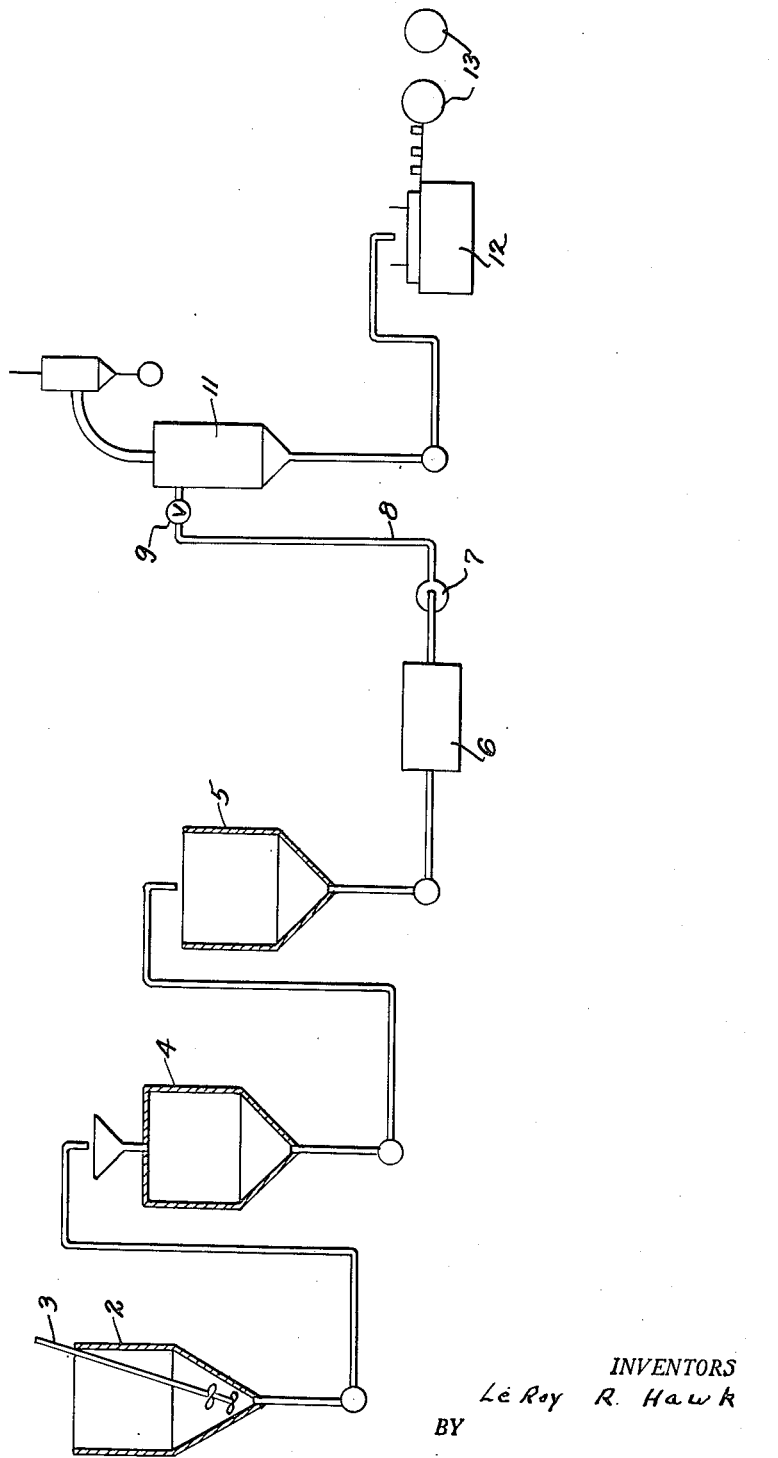

2,766,126

CANNED EGG YOLK PUREE AND PROCESS OF PRODUCING SAME

Le Roy R. Hawk, San Lorenzo, Calif., assignor to Gerber Products Company, Fremont, Mich., a corporation of Michigan Application January 12, 1953, Serial No. 330,844

12 Claims. (Cl. 99—182)

The present invention relates to a new food product and process of producing same. More particularly, the invention relates to a new egg product and method of preparation and is especially directed to a canned egg yolk puree and process of producing same.

It is a prime object of the present invention to provide a method of treating egg material to produce an improved egg food product.

It is an objective of the present invention to produce a stable, sterile canned egg yolk puree which has characteristic egg flavor, smooth, uniform texture and consistency, is attractive in appearance and contains all of the nutritional value of the fresh egg yolk.

It is a more specific object of the present invention to provide a canned egg yolk puree wherein the protein content of the egg yolk is first partially coagulated in a finely divided state so that when the product is sterilized there is a minimum of water separation and hardening of the product which would otherwise render the product unpalatable, if not entirely unedible. The success of the invention resides in large part in a new process involving partial coagulation of the protein content of the egg yolk while in a finely divided state and prior to final sterilization.

The partial coagulation of the protein content of the egg appears to make the final product more readily digestible. Thus, an important advantage in the present invention is in its nutritional value as a food product for infants.

The product of the present invention may be produced from egg yolk, such as dehydrated egg yolk, fresh egg yolk, or frozen egg yolk. The product may be described as a canned egg yolk puree having a uniform, smooth texture and consistency similar to that of smooth custard pudding and which is bright yellow in color such as fresh, salted creamery butter. The product has the inherent and characteristic flavor of egg yolk. It is a sterile, stable, thixotropic, macroscopic, colloidal suspension of egg yolk solid and water and wherein the protein content of the egg is heat coagulated while in a finely divided state.

The steps of the process of preparing the product will now be described with reference to the flow sheet drawing. Egg yolk, such as frozen yolk, containing approximately 43% to 47% of solids and the remainder water, is placed in a preparation tank 2, and which tank is provided with a mechanical agitating member 3. The yolk is mixed with water in tank 2 to dilute the solids and form an aqueous slurry. From a practical working point of view dilution in the order of 20% to 35% solids to water has been found to produce a most satisfactory product. The yolk may be diluted more or less. If, however, too much dilution occurs a degree of water separation in the end product may result. Again, if there is not a sufficient dilution, the end product may result in a somewhat lumpy texture.

It is also possible to form an aqueous slurry of egg yolk and liquids other than water such as, for example, dairy milk and, roughly, in the same proportions of solids to liquid as heretofore noted. It is further noted that the range of dilution of 20% to 35% solids and the remainder liquid is a variable range and may extend upwardly and downwardly. As will hereinafter appear, slight further liquid is added to the egg yolk product during heating in view of the fact that steam injection heating preferably is employed. However, after the initial heating by steam injection the product is flash evaporated and the moisture loss at time of evaporating approximately balances the quantity added during heating. Therefore, the ratio of liquid to solid at the start of processing equals, for practical purposes, the liquid to solid content of the end product.

After the liquid and egg yolk are throughly mixed in tank 2 the slurry is forwarded to a mechanical strainer or finisher 4, at which time salt is added for purposes of flavor enhancement. The water, egg and salt are mixed in the finisher 4. We have found that the addition of approximately .5% of sodium chloride by weight to the total end product produces a satisfactory flavor characteristic. The slurry is then pumped from the finisher to a surge tank 5 and thence pumped to a homogenizing unit 6 which pumps the slurry to an agitating steam injection heater 7 of the type disclosed in United States Letters Patent No. 2,492,635, dated December 27, 1949, and which agitating heater agitates the slurry while heating the same by means of steam jetting to a temperature above the temperature of egg yolk protein coagulation, which is within the range of approximately 140° F. to 160° F.

The slurry is heated to a temperature and for a time sufficient partially to coagulate the protein content of the yolk in a finely divided state. The partial coagulation step is essential to the success of the process and product. In the partial coagulation of protein step the yolk content is heated by steam injection while being agitated to a temperature above that of the temperature of egg yolk protein coagulation and is held at such temperature for a sufficient period of time to coagulate a major proportion of the protein content of the egg yolk while leaving a minor proportion of the protein content in an uncoagulated state. The minor proportion of uncoagulated protein is sufficient so that when the product is sterilized, as will hereinafter appear, the uncoagulated protein content forms a gel structure to hold or suspend the previously coagulated major proportion of protein in the so formed gel structure.

We have observed that after partial coagulation of the protein content in a finely divided state the viscosity of the aqueous slurry is usually slightly less than that of the starting mixture. The preheat treatment, mechanical agitation, and subsequent cooling reduces the viscosity to approach that of water or milk in fluidity characteristics.

From the agitating heater the heated slurry is held in holding pipe 8 by means of a suitable holding or valve mechanism 9 for a time interval sufficient to insure the required partial precoagulation of the protein content. We have found that heating to a temperature of between 215° F. and 280° F. for two seconds produces a good product. Good results also have been secured when heating the slurry from 190° F. to 256° F. for less than one second. We have found that between 248° F. and 252° F. for less than one second produces a uniformly good product.

After partial protein precoagulation the slurry is conveyed to a conventional vacuum flash evaporator 11 where the product is chilled preferably instantaneously to a point below the coagulation point of egg yolk protein in order to terminate coagulation. We have found that flash evaporating to chill to a temperature around 118° F. to 125° F. is satisfactory.

From the flash evaporator the product is pumped to a can filling and closing machine, indicated generally at 12, and after the cans have been filled and closed they are conveyed to conventional retort machines 13 for sterilization. We have found that retorting to a temperature of approximately 240° F. for forty-five minutes meets all requirements of sterilization. The retorting time and temperature may vary so long as sufficient for proper sterilization.

The examples given hereinafter illustrate methods of practicing the present invention, it being understood, however, that the conditions set forth in the following examples may be varied freely as to time and temperature of partial coagulation and retorting and dependent upon liquid dilution of the slurry. It is also contemplated that variation in time, and temperature and dilution may occur through addition of certain salts, such as calcium salts, which are known to influence coagulation characteristics of proteins. Similarly, other salts and materials, including proteolytic enzymes, known to the art, may be added to influence coagulation behavior and hence temperatures and times. However, in the examples set forth hereinafter nothing was used but egg yolk solids, water (East Bay Municipal Utility District tap water) and .5% by weight of sodium chloride.

*Example 1.*—Frozen egg yolks were diluted with water to form a slurry containing approximately 32.4% solids. The slurry was heated, during the partial precoagulation step, to 280° F. for a period of two seconds. The slurry was then chilled by flash evaporation to 125° F. and thereafter retorted at 240° F. for a period of forty-five minutes. The resultant product had a pH of 6.55. The texture was very smooth and the consistency was that of a smooth, thick paste which was readily spoonable. The color was slightly lighter than a bright yellow approximating that of fresh salted dairy butter.

*Example 2.*—Frozen egg yolk was mixed with water to form a slurry of 31.7% solids. The slurry was heated to a precoagulation temperature of 215° F. for two seconds, chilled to 125° F. and retorted at 240° F. for forty-five minutes. The resultant product had a pH of 6.6. The end product was satisfactory but contained fine grain curds. Its consistency was thicker than Example 2 but spooned readily.

*Example 3.*—The slurry contained 32.2% solids to water. It was subjected to a precoagulation temperature of 240° F. for two seconds, chilled to 125° F. and retorted at 240° F. for forty-five minutes. The end product had a pH of 6.58. The texture was very smooth and fine and the consistency was that of smooth paste.

*Example 4.*—The slurry was the same as Example 3 and was processed the same except that it was heated to a precoagulation temperature of 260° F. for two seconds. The end product had a pH of 6.52. The other characteristics of the product were the same as Example 3.

*Example 5.*—The slurry contained 24% solids. The slurry was heated to a precoagulation temperature of 260° F. for approximately forty seconds, then chilled to approximately 120° F. and retorted at 240° F. for forty-five minutes. The end product had a pH of 6.68, excellent smooth texture and consistency.

*Example 6.*—The slurry contained 12.45% total solids. The slurry was subjected to a temperature ranging from 248° F. to 254° F. for less than one second, chilled to a temperature ranging between 120° F. and 125° F., retorted at 240° F. for forty-five minutes. The end product had a pH of 6.35, showed watery separation, and texture was smooth and good.

*Example 7.*—The slurry contained 42% total solids. It was subjected to a temperature range from 250° F. to 252° F. for less than one second, chilled to temperature ranging between 120° F. and 125° F., retorted at 240° F. for forty-five minutes. The end product had a pH of 6.22, texture was somewhat lumpy and showed some watery separations.

*Example 8.*—The slurry contained 22.3% total solids. The slurry was subjected to a temperature ranging from 248° F. to 258° F. for less than one second, chilled to temperature ranging between 120° F. and 125° F. and retorted at 240° F. for forty-five minutes. The end product had a pH of 6.33 and texture and consistency were good.

*Example 9.*—The slurry contained 22.45% total solids. The slurry was subjected to a temperature ranging from 246° F. to 252° F. for less than one second, chilled to a temperature ranging between 120° F. and 125° F. and retorted at 240° F. for forty-five minutes. The end product had a pH of 6.34 and was otherwise the same as the very satisfactory product of Example 8.

*Example 10.*—The slurry contained 27% total solids. The slurry was subjected to a precoagulation temperature of approximately 240° F. for approximately forty seconds, chilled to approximately 120° F., and retorted at 242° F. for forty-six minutes. The end product had a pH of 6.54 and the texture and consistency were good.

*Example 11.*—The slurry contained 42.87% total solids. The slurry was subjected to a precoagulation temperature of approximately 289° F. for 1.8 seconds, chilled to a temperature ranging between 108° F. and 120° F., and was retorted at 240° F. for forty-five minutes. The end product had a pH of 6.43 and showed a viscosity measurement of 690,000 Cps. The texture showed a slight tendency of sandiness to the tongue.

*Example 12.*—The slurry contained 28.28% total solids. The slurry was subjected to a precoagulation temperature of approximately 290° F. for 1.8 seconds, chilled to a temperature of 120° F. and was retorted at 240° F. for forty-five minutes. The end product had a pH of 6.59 and showed a viscosity reading of 184,000 Cps. The texture showed a tendency to sandiness which was the same as Example 11.

*Example 13.*—The slurry contained 18.97% total solids. The slurry was subjected to a precoagulation temperature of approximately 212° F. for 1.8 seconds, chilled to a temperature of 120° F., and was retorted at 240° F. for forty-five minutes. The end product had a pH of 6.68 and showed a viscosity reading of 256,000 Cps.

*Example 14.*—The slurry contained 10.57% total solids. The slurry was subjected to a precoagulation temperature of approximately 210° F. for 1.8 seconds, chilled to a temperature of 120° F., and was retorted at 240° F. for forty-five minutes. The end product had a pH of 6.80 and showed a viscosity reading of 43,000 Cps.

*Example 15.*—The slurry contained 20.73% total solids. The slurry was subjected to a precoagulation temperature of 278° F. for 1.75 minutes, chilled to a temperature of 120° F., and retorted at 240° F. for forty-five minutes. The end product had a pH of 6.72 and showed a viscosity reading of 17,200 Cps.

Each of the above listed examples, 1 through 15, was prepared from frozen egg yolks. The color in each instance was an attractive bright yellow.

The following Examples 16 through 23 were prepared from dehydrated egg yolk, and in each instance the color was an attractive bright yellow. The texture was smooth as in smooth custard pudding although in cases where the partial or pre-coagulation temperature exceeded 290° F. there was a tendency toward sandiness discernible upon contact with the tongue.

We have observed that high temperatures and long holding periods during the partial coagulation step tend to decrease the viscosity of the slurry and to impart a grainy texture.

At this point it may be noted htat the viscosity of the end product may vary from 2000 to 2,000,000 cps. An optimum viscosity of the egg puree of this invention, at least for infant or baby food, is in the neighborhood of about 125,000 cps.

*Example 16.*—The slurry contained 22.76% total solids. The slurry was subjected to a precoagulation temperature of approximately 206° F. for 1.8 seconds, chilled to a temperature of 118° F., and was retorted at 240° F. for forty-five minutes. The end product had a pH of 6.45 and showed a viscosity reading of 475,000 cps.

Example 17.—The slurry contained 24.80% total solids. The slurry was subjected to a precoagulation temperature of approximately 296° F. for 1.8 seconds, chilled to a temperature of 118° F., and was retorted at 240° F. for forty-five minutes. The end product had a pH of 6.45 and showed a viscosity reading of 30,400 cps.

Example 18.—The slurry contained 36.15% total solids. The slurry was subjected to a precoagulation temperature of approximately 210° F. for 1.8 seconds, chilled to a temperature of 118° F., and was retorted at 240° F. for forty-five minutes. The end product had a pH of 6.39 and showed a viscosity reading of 1,780,000 cps.

Example 19.—The slurry contained 15.07% total solids. The slurry was subjected to a precoagulation temperature of approximately 210° F. for 1.8 seconds, chilled to a temperature of 118° F., and was retorted at 240° F. for forty-five minutes. The end product had a pH of 6.61 and showed a viscosity reading of 135,000 cps.

Example 20.—The slurry contained 33.75% total solids. The slurry was subjected to a precoagulation temperature of approximately 280° F. for 1.8 seconds, chilled to a temperature of 118° F., and was retorted at 240° F. for forty-five minutes. The end product had a pH of 6.43 and showed a viscosity reading of 220,000 cps.

Example 21.—The slurry contained 42.08% total solids. The slurry was subjected to a precoagulation temperature of approximately 270° F. for 1.8 seconds, chilled to a temperature of 118° F., and was retorted at 240° F. for forty-five minutes. The end product had a pH of 6.40 and showed a viscosity reading of 1,800,000 cps.

Example 22.—The slurry contained 23.66% total solids. The slurry was subjected to a precoagulation temperature of 238° F. for 1.75 minutes, chilled to a temperature of 120° F., and was retorted at 240° F. for forty-five minutes. The end product had a pH of 6.57 and showed a viscosity reading of 28,000 cps.

Example 23.—The slurry contained 22.74% total solids. The slurry was subjected to a precoagulation temperature of 200° F. for 1.75 minutes, chilled to a temperature of 120° F., and retorted at 240° F. for forty-five minutes. The end product had a pH of 6.57 and showed a viscosity reading of 302,000 cps.

The following example was run with fresh, homogenized, pasteurized dairy milk:

Example 24.—15 pounds milk and 30 pounds frozen egg yolks were formed into an aqueous slurry. The slurry contained 31.98% total milk and egg solids. The slurry was subjected to a partial coagulation temperature of 240° F. for 7 seconds, chilled to a temperature of 118° F., and retorted at 240° F. for forty-five minutes. The end product had a pH of 6.52 and showed a viscosity reading of 420,000 cps.

The following example was the same as Example 24 except that water was substituted for milk:

Example 25.—15 pounds water and 30 pounds frozen egg yolks were formed into an aqueous slurry. The slurry contained 28.68% total solids. The slurry was subjected to a partial coagulation temperature of 240° F. for 7 seconds, chilled to a temperature of 118° F., and retorted at 240° F. for forty-five minutes. The end product had a pH of 6.58 and showed a viscosity reading of 78,000 cps.

In each of the aforementioned examples approximately .05% by weight of sodium chloride was added for flavor. In each example the slurry was chilled by flash evaporation.

Again, flash evaporation of the slurry may constitute to the success of the new product in further dividing the yolk particles and in deaerating the product before canning. Tests indicate that as the time of holding is increased during the step of partial precoagulation the protein particles tend to shrink and harden so that the end product is thinner and has a grainy or sandy texture. Similarly, as the temperature to which the product is subjected during the partial or precoagulation step is increased over approximately 250° F., the end product tends to less viscosity and a slight sandiness in texture.

In general it may be stated that the total solids in the puree are between 5% and 50% by weight, and that the time of heating during partial coagulation is between one second and one minute and at a temperature of 190° F. to 296° F.

In summation, the invention produces a new food product comprising a canned egg yolk puree which contains all of the nutritional value of fresh egg yolk. The product has an attractive bright yellow appearance and a smooth, uniform texture and consistency approximating smooth custard pudding. The flavor of the product is comparable favorably to that of the inherent characteristic cooked egg yolk flavor.

An essential step of the invention resides in the partial or precoagulation step, i. e. partial precoagulation of the protein content of the egg prior to further processing to preserve the egg. The term "egg material" includes egg yolks alone or mixed with whites. The term "dairy milk" as used in the claims includes liquid whey, skimmed milk, market milk, liquid cream, goat's milk and evaporated milk.

While the invention has been described for purposes of clarity of understanding by reference to illustration and example, it is to be understood that variations and modifications in the process and practice thereof may be desirable. Therefore, this application contemplates all modifications coming within the scope of the appended claims.

We claim:

1. In the art of treating egg material, the steps comprising partially coagulating the protein content of the egg material by means of heat treatment, said heat treatment being within the range of between above 190° F. and less than 296° F. for a period of between about one second and 1.75 minutes, terminating coagulation, and then subjecting the material to further processing to preserve the same.

2. A method of preparing an egg product comprising the steps of mixing egg yolk and water to form an aqueous slurry, subjecting the slurry to steam while agitating the same to partially coagulate a major proportion, but not all, of the protein content of the egg yolk above a temperature of 190° F. and less than 296° F. for a period of from about one second to 1.75 minutes, then sealing said slurry in a hermetically sealed container, and then sterilizing the product to form a sterile puree.

3. A method of preparing an egg product comprising the steps of mixing egg yolk and water to form an aqueous slurry, said slurry comprising not less than 5% and not more than 50% by weight of egg yolk solids, subjecting the slurry to steam while agitating the same to partially coagulate a major proportion, but not all, of the protein content of the egg yolk above a temperature of 190° F. and less than 296° F. for a period of from about one second to 1.75 minutes, then sealing said slurry in a hermetically sealed container, and then sterilizing the product to form a sterile puree.

4. A method of preparing an egg product comprising the steps of mixing egg yolk and water to form an aqueous slurry, subjecting the slurry to steam while agitating the same to partially coagulate a major proportion, but not all, of the protein content of the egg yolk above a temperature of 190° F. and less than 296° F. for a period of from about one second to 1.75 minutes, then rapidly reducing the temperature of said slurry below 140° F., then sealing said slurry in a hermetically sealed container, and then sterilizing the product to form a sterile puree.

5. A method of preparing an egg product comprising the steps of mixing egg yolk and water to form an aqueous slurry, subjecting the slurry to steam while agitating the same to partially coagulate a major proportion, but not all, of the protein content of the egg yolk above a temperature of 190° F. and less than 296° F. for a period of from about one second to 1.75 minutes, then rapidly reducing the temperature of said slurry below 140° F. by flash evaporation, then sealing said slurry in a hermetically sealed container, and then sterilizing the product to form a sterile puree.

6. A method for producing a canned egg yolk puree comprising the steps of mixing egg yolk and water to form an aqueous slurry, subjecting the slurry to heat above that of the temperature of normal egg yolk protein coagulation while agitating the slurry for a time sufficient partially to coagulate a major proportion of the protein content of the egg, said heat being above 190° F. and less than 296° F. and for a time of between about one second to about 1.75 minutes.

7. A method of preparing canned egg yolk puree which includes the steps of partially coagulating the protein content of the egg yolk in a finely divided state by forming a slurry of egg yolk and a liquid selected from the class consisting of water and dairy milk and subjecting the same to heat and agitation to produce a substantially homogeneous mass, said slurry being subjected to heat in the range of above 190° F. and less than 296° F. for a time between about one second and 1.75 minutes, then stopping the process of protein coagulation, and then subjecting the puree to further processing to preserve and sterilize the same.

8. A method of preparing a canned egg yolk puree which includes the steps of forming an aqueous slurry of egg yolk and a liquid selected from the class consisting of water and dairy milk, then partially coagulating the protein content of the egg yolk by subjecting the same to heat and dispersing the coagulated protein substantially uniformly in the puree, said heating being in the range of between above 190° F. and less than 296° F. for a time between about one second and 1.75 minutes, then rapidly reducing the temperature of said slurry to below 140° F., then sealing said egg yolk in a hermetically sealed container, and then sterilizing by heat.

9. A method of preparing an egg product comprising the steps of mixing egg yolk and water to form a slurry having a total solid content of from 20% to 35%, subjecting the slurry to a steam while agitating the same to heat the slurry to a temperature of between above 190° F. and less than 296° F. for a time between about one second and 1.75 minutes, then reducing the temperature of said slurry rapidly to less than about 140° F., then sealing said egg product in a hermetically sealed container, and then sterilizing the product.

10. As a new product, egg material prepared in accordance with the process of claim 1.

11. As a new product, egg yolk puree made in accordance with the process of claim 7.

12. As a new product, canned egg yolk puree made in accordance with the method of claim 9.

References Cited in the file of this patent

UNITED STATES PATENTS

| 1,385,246 | Crocker | July 19, 1921 |
| 2,093,786 | Swarthout | Sept. 21, 1937 |
| 2,421,199 | Gutmann | May 27, 1947 |
| 2,458,449 | Urbain et al. | Jan. 4, 1949 |

OTHER REFERENCES

"Food Packer," January 1951, pages 20, 21, 38, 40, and 42, article entitled Flash Heat.

"Food Engineering," August 1953, page 143, article entitled Strained Egg Yolk Product.